UNITED STATES PATENT OFFICE.

IGNAZ ROSENBERG, OF BIEBRICH, GERMANY, ASSIGNOR TO KALLE & CO., OF SAME PLACE.

DEEP-BLUE DYE AND PROCESS OF MAKING SAME.

SPECIFICATION forming part of Letters Patent No. 613,642, dated November 1, 1898.

Application filed December 27, 1897. Serial No. 663,475. (Specimens.)

*To all whom it may concern:*

Be it known that I, IGNAZ ROSENBERG, a subject of the Emperor of Austria-Hungary, doctor of philosophy, residing at Biebrich-on-the-Rhine, Germany, and assignor to KALLE & Co., of same place, have invented a new and useful Improvement in the Manufacture of Mixed Substantive Dyestuffs, (for which patents have been granted in England, No. 9,103, dated May 7, 1895; in France, No. 247,626, dated May 22, 1895, and in Germany, No. 93,595, dated March 31, 1895,) of which the following is a specification.

In United States Patent No. 588,182 a process is described for preparing mixed substantive disazo dyestuffs by combining the tetrazo compounds of the usual paradiamins with one molecular proportion of a phenol or an amin, or of sulfo or carbo acids thereof, and one molecular proportion of 1.3.6 naphthylenediaminsulfo-acid. In the course of further investigations on this process I have found that especially those dyestuffs are of high technical value which are prepared by combining one molecule of a tetrazo compound of the usually-employed paradiamins with one molecule of a paraämidonaphtholsulfo-acid and one molecule of 1.3.6 naphthylenediaminsulfo-acid. These dyestuffs dye unmordanted cotton bluish-violet to indigo-blue shades from weakly-alkaline baths or from baths prepared with salt.

In carrying out my invention I proceed, for instance, as follows: 9.2 kilos benzidin are dissolved in four hundred liters of water and thirty kilos hydrochloric acid, cooled with ice to about 8° centigrade, and diazotized by means of 6.9 kilos sodium nitrite. The so-obtained diazo solution is run into a solution of 17.1 kilos 1.8.4.6 amidonaphtholdisulfo-acid (K) and thirty-five kilos soda-ash in five hundred liters of ice-water. The intermediate product is completely formed after about half an hour and is separated as a dark precipitate. Under further stirring I then added to this reaction liquid a solution of twelve kilos 1.3.6 naphthylenediaminsulfo-acid and two kilos caustic soda in two hundred and fifty liters of water cooled with one hundred kilos ice. The previously-separated intermediate product now begins to dissolve, and after about four to six hours the formation of the dyestuff is completed. The mass is then heated up and the dyestuff salted out, filtered, pressed, and dried. The coloring-matter so obtained represents a dark powder of intense bronzy luster. It dissolves easily in water with bluish-violet color and in concentrated sulfuric acid with pure-blue color. In alcohol it is insoluble. From the solution in concentrated sulfuric acid the free acid of the coloring-matter separates out on addition of water as a violet precipitate.

The dyestuff dyes unmordanted cotton deep-blue indigo-like shades from a weakly-alkaline or a salt bath. It can be diazotized again in substance as well as on the fiber and yields on combination with the usual developers very fast deep-blue to black shades.

The substitution of the benzidin by the other paradiamins only alters the character of the dyestuff immaterially.

What I claim is—

1. The process of producing the specific mixed substantive dyestuff having the formula:

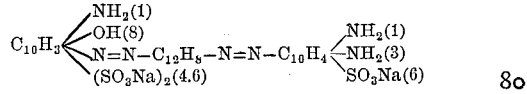

by combining the tetrazo compound of benzidin first with one molecular proportion of 1.8.4.6 amidonaphtholdisulfo-acid (K) to an intermediate product which is then put into reaction with one molecular proportion of 1.3.6 naphthylenediaminsulfo-acid substantially as described.

2. The new mixed substantive dyestuff herein described, which represents a dark powder of intense bronzy luster, very easily soluble in cold water with blue-violet color, soluble in concentrated sulfuric acid with pure-blue color, insoluble in cold alcohol, the solution of which in concentrated sulfuric acid gives with water a violet precipitate, and which dyes unmordanted cotton deep-blue indigo-like shades from a weakly-alkaline or salt bath.

In testimony whereof I have signed my name to this specification in the presence of two subscribing witnesses.

IGNAZ ROSENBERG.

Witnesses:
  C. REINHARD,
  JACOB ADRIAN.